United States Patent
Yamane et al.

(10) Patent No.: US 8,876,511 B2
(45) Date of Patent: Nov. 4, 2014

(54) METERING FEEDER, AND SYSTEM AND METHOD FOR KNEADING AND EXTRUDING MATERIAL

(75) Inventors: Yasuaki Yamane, Takasago (JP); Hideo Funahashi, Takasago (JP); Koichi Miyake, Takasago (JP)

(73) Assignee: Kobe Steel, Ltd., Kobe-shi (JP)

(*) Notice: Subject to any disclaimer, the term of this patent is extended or adjusted under 35 U.S.C. 154(b) by 1268 days.

(21) Appl. No.: 10/883,700

(22) Filed: Jul. 6, 2004

(65) Prior Publication Data

US 2005/0006813 A1 Jan. 13, 2005

(30) Foreign Application Priority Data

Jul. 11, 2003 (JP) ................................ 2003-273554

(51) Int. Cl.
| | | |
|---|---|---|
| B29C 47/38 | (2006.01) | |
| B29C 47/10 | (2006.01) | |
| B29C 47/36 | (2006.01) | |
| B02C 19/22 | (2006.01) | |
| B29B 13/10 | (2006.01) | |
| B02C 18/14 | (2006.01) | |
| B02C 18/30 | (2006.01) | |
| B29C 47/00 | (2006.01) | |
| B29K 9/06 | (2006.01) | |
| B29K 21/00 | (2006.01) | |
| B29K 105/00 | (2006.01) | |

(52) U.S. Cl.
CPC ................ *B29B 13/10* (2013.01); *B29C 47/10* (2013.01); *B29C 47/364* (2013.01); *B02C 19/22* (2013.01); *B29C 47/0009* (2013.01); *B29C 47/1027* (2013.01); *B29C 47/1081* (2013.01); *B29K 2009/06* (2013.01); *B29C 47/367* (2013.01); *B29C 47/1063* (2013.01); *B02C 18/148* (2013.01); *B29K 2021/00* (2013.01); *B29K 2105/0005* (2013.01); *B02C 18/301* (2013.01)
USPC ........... 425/113; 264/1.29; 264/3.3; 264/433; 264/464; 264/45.8; 264/45.9; 264/140; 264/141; 264/209.8; 264/211.23; 425/516; 425/114; 425/131.1; 425/190

(58) Field of Classification Search
USPC ........ 524/192; 264/211.21, 138, 349, 211.23, 264/118; 425/516, 197–199, 200–209, 331; 525/192
See application file for complete search history.

(56) References Cited

U.S. PATENT DOCUMENTS 5,094,606 A * 3/1992 Lambertus .................... 425/311
6,399,709 B1 * 6/2002 Moriguchi et al. ........... 525/199
(Continued)

FOREIGN PATENT DOCUMENTS

DE 42 14 481 C1 5/1993
DE 196 02 091 A1 7/1997
(Continued)

OTHER PUBLICATIONS

German Office Action dated Oct. 30, 2012 in German Patent Application No. 10 2004 033 344.0 (with English translation).

*Primary Examiner* — Jeffrey Wollschlager
*Assistant Examiner* — Stella Yi
(74) *Attorney, Agent, or Firm* — Oblon, Spivak, McClelland, Maier & Neustadt, L.L.P.

(57) ABSTRACT

A system for kneading and extruding a material includes a crusher for crushing the material into coarse particles, an extruder for conveying and extruding the material crushed by the crusher, a gear pump for receiving and discharging the material extruded from the extruder, and a kneading and extruding apparatus for kneading the material discharged from the gear pump and continuously extruding the kneaded material. Therefore, a material is accurately quantified and highly uniform, resulting in reduced product variations and ensured consistent quality.

3 Claims, 7 Drawing Sheets

(56) References Cited

U.S. PATENT DOCUMENTS

| | | | |
|---|---|---|---|
| 6,468,067 B1 * | 10/2002 | Ikegami | 425/209 |
| 2002/0186612 A1 * | 12/2002 | Murakami et al. | 366/79 |
| 2003/0090955 A1 * | 5/2003 | Murakami et al. | 366/76.2 |
| 2004/0140583 A1 | 7/2004 | Uphus | |
| 2004/0186236 A1 * | 9/2004 | Komine et al. | 525/192 |
| 2005/0087906 A1 * | 4/2005 | Caretta et al. | 264/211 |
| 2006/0108706 A1 * | 5/2006 | Galimberti et al. | 264/211.23 |

FOREIGN PATENT DOCUMENTS

| | | |
|---|---|---|
| DE | 693 12 246 T2 | 1/1998 |
| DE | 101 34 701 A1 | 1/2003 |
| DE | 10 2004 011 670 A1 | 9/2004 |
| JP | 8-132433 | 5/1996 |
| JP | 11-262945 | 9/1999 |
| JP | 2000-43032 | 2/2000 |
| JP | 2002-138146 | 5/2002 |
| JP | 2004-299379 | 10/2004 |

* cited by examiner

METERING FEEDER, AND SYSTEM AND METHOD FOR KNEADING AND EXTRUDING MATERIAL

BACKGROUND OF THE INVENTION

1. Field of the Invention

The present invention relates to a metering feeder, and a system and method for kneading and extruding a material. In particular, the present invention is suitable for application to a material comprising a rubber composition (hereinafter referred to as "rubber material").

2. Description of the Related Art

To knead a rubber material and render the rubber material uniform, a twin-screw kneading extruder is commonly used. In such a twin-screw kneading extruder, a pair of revolving screws are disposed adjacent to each other in a lateral direction so that a group of blades of one screw is partly engaged with that of the other screw. A rubber material is kneaded and conveyed by the pair of revolving screws, and the kneaded material is extruded through a die provided at the end. In addition to the use of this extruder, other various suggestions have been made.

For example, Japanese Unexamined Patent Application Publication No. 8-132433 discloses a technique for crushing bale rubber, kneading the crushed rubber, and continuously extruding the rubber. This technique includes a process having the steps of: supplying vulcanizable rubber to a conical-screw feeder; crushing and dynamically masticating the rubber in the conical-screw feeder; and extruding the rubber in a desired shape. This technique does not need the time and effort required for the use of a guillotine cutter or Banbury mixer; it provides a method with increased productivity at low cost, i.e., a method for processing bale rubber continuously, stably, and safely.

A manufacturing system is known in which a rubber block supplied from a first extruder for supplying a rubber block and an auxiliary material supplied from a second extruder for supplying an auxiliary material are metered to a continuous extruder for kneading both materials together. One known method for manufacturing a rubber composition by using such a manufacturing system is disclosed in Japanese Unexamined Patent Application Publication No. 11-262945. In this method, in order to accurately supply a rubber block to the continuous extruder, a pressure of 10 kgf/cm$^2$ or more is applied to a conveyed rubber block immediately downstream of the tips of screws of the first extruder, i.e., at a head, where the highest pressure is applied to the rubber block, and the percentage of change in pressure at the head is held within 10%. According to this method, a rubber block is continuously supplied with stability, and therefore, a stable kneading can be performed in the continuous extruder.

When kneaded in a slightly compressed state, a high-viscosity material, such as rubber, is susceptible to a surging problem, which causes variable output, thus resulting in unevenness in quality. Therefore, the use of only a common kneading extruder is insufficient for ensuring consistent quality. For quantification and uniformity of a material, one known technique described above has a preprocessing step of crushing bale rubber and kneading the rubber by a conical-screw feeder; the other known technique kneads a rubber block and an additive together in a continuous extruder and controls the pressure. These features can improve the quantification and uniformity of a rubber material, but only a little. Therefore, a further improvement is required.

SUMMARY OF THE INVENTION

It is an object of the present invention to accurately quantify a material and make the material highly uniform to reduce product variations and ensure consistent quality in a system for kneading and continuously extruding the material.

According to a first aspect of the present invention, a metering feeder for supplying a material to a kneading and extruding apparatus for kneading the material and continuously extruding the kneaded material is provided. The metering feeder includes: a crusher for crushing the material into coarse particles; an extruder for conveying and extruding the material crushed by the crusher; and a gear pump for receiving and discharging the material extruded from the extruder.

In this metering feeder, the material to be supplied to the extruder is crushed by the crusher in advance. Therefore, the material is kneaded and continuously extruded from the extruder. Additionally, this pre-kneaded material is discharged from the gear pump so that the material is accurately metered to the kneading and extruding apparatus. This metering feeder is particularly suited to a rubber material.

In other words, the rubber material, which is difficult to be evenly kneaded because of its high viscosity, is crushed, kneaded, and then metered to the kneading and extruding apparatus for kneading and continuously extruding the rubber material. The preprocessing of crushing and kneading the rubber material achieves consistent quality of the rubber material to some extent before the rubber material is supplied to the kneading and extruding apparatus. As a result, the metering feeder can enhance the advantages to reduce product variations, improve the quality of the rubber material, and secure the quality in the kneading and extruding apparatus.

According to a second aspect of the present invention, a system for kneading and extruding a material is provided. The system includes: a crusher for crushing the material into coarse particles; an extruder for conveying and extruding the material crushed by the crusher; a gear pump for receiving and discharging the material extruded by the extruder; and a kneading and extruding apparatus for kneading the material discharged from the gear pump and continuously extruding the kneaded material.

In this system, the material supplied from the metering feeder according to the first aspect of the present invention, i.e., the metering feeder having the advantageous effects described above is supplied to the kneading and extruding apparatus. As a result, the operation of kneading and extruding is performed twice in total. When a rubber material, which is difficult to be made uniform because of its high viscosity, is used, the resulting rubber material has reduced or eliminated product variations and is made uniform, and therefore, the resulting rubber material having consistently high quality is continuously metered.

The system according to the second aspect of the present invention may further include first means for supplying an additive to the kneading and extruding apparatus. The kneading and extruding apparatus may knead the material discharged from the gear pump together with the additive supplied from the first means in a compressed state.

In this system, therefore, the pre-kneaded material discharged from the gear pump and the additive supplied from the first means can be kneaded together effectively and evenly. As a result, when a rubber material is used, the resulting rubber material with a desired property and high quality can be produced.

In the system according to the second aspect of the present invention, the kneading and extruding apparatus may have at least two kneading portions for kneading the supplied material.

In this system, therefore, when a rubber material, which is difficult to be made uniform because of its viscosity, is used, the rubber material can be sufficiently kneaded, and thus, the resulting rubber material with few variations and consistent quality can be produced.

The system according to the second aspect of the present invention may further include second means for applying a resistance to the material discharged from the gear pump and supplying the material to the kneading and extruding apparatus. The second means may be disposed immediately in front of the kneading and extruding apparatus.

In this system, therefore, the discharge pressure of the gear pump and the amount of discharged flow are stable. Additionally, regulating the amount of the material supplied to the kneading and extruding apparatus from the second means can avoid causing the discharged rubber material to be stretched and pulled into the kneading and extruding apparatus in a large amount at once. As a result, a good quantification of the material at the discharge port of the gear pump is maintained when the material enters the kneading and extruding apparatus, and therefore, the quantification before the kneading and extruding apparatus is ensured. This contributes to the realization of consistent quality.

In the metering feeder according to the first aspect of the present invention or the system according to the second aspect thereof, the crusher may include a screw hammer for shearing and conveying the material by rotation thereof, an orifice plate for squeezing the material conveyed by the hammer out, and a cutter for cutting the material passing through the orifice plate.

In this crusher of the metering feeder or the system, the material sheared and conveyed by rotation of the hammer is squeezed and compressed when passing through the orifice plate. Therefore, the material in a compressed state is allowed to be cut into smaller pieces by the cutter. As a result, even when the material is a rubber material in bale or block form, the material can be crushed and cut into coarse particles suited for kneading and extruding operation, and therefore, preprocessing of crushing the rubber material is advantageously automated.

According to a third aspect of the present invention, a method for kneading and extruding a material is provided. This method includes the steps of: crushing a material comprising a rubber composition into coarse particles by a crusher; conveying and extruding the crushed material by an extruder; discharging the extruded material by a gear pump; and continuously extruding the material discharged from the gear pump by a kneading and extruding apparatus.

This method uses the system according to the second aspect of the present invention to knead and extrude the rubber material, achieving the same advantageous effects as that of the second aspect.

DESCRIPTION OF THE PREFERRED EMBODIMENTS

A system for kneading and extruding a material according to the present invention includes a metering feeder performing a preprocessing step and a kneading and extruding apparatus. The preprocessing step includes crushing a rubber material, which comprises a rubber composition (e.g., EPDM, NR, NBR, SBR, SBS, IIR, BR, EPR), in bale or block form and metering the crushed material to the kneading and extruding apparatus by means of a gear pump. Specifically, the system for kneading and extruding the material includes a crusher for cutting and crushing a rubber material into coarse particles, an extruder having twin screws, the gear pump, an additive feeder, and the kneading and extruding apparatus performing continuous extrusion and having twin screws.

Figure 1:
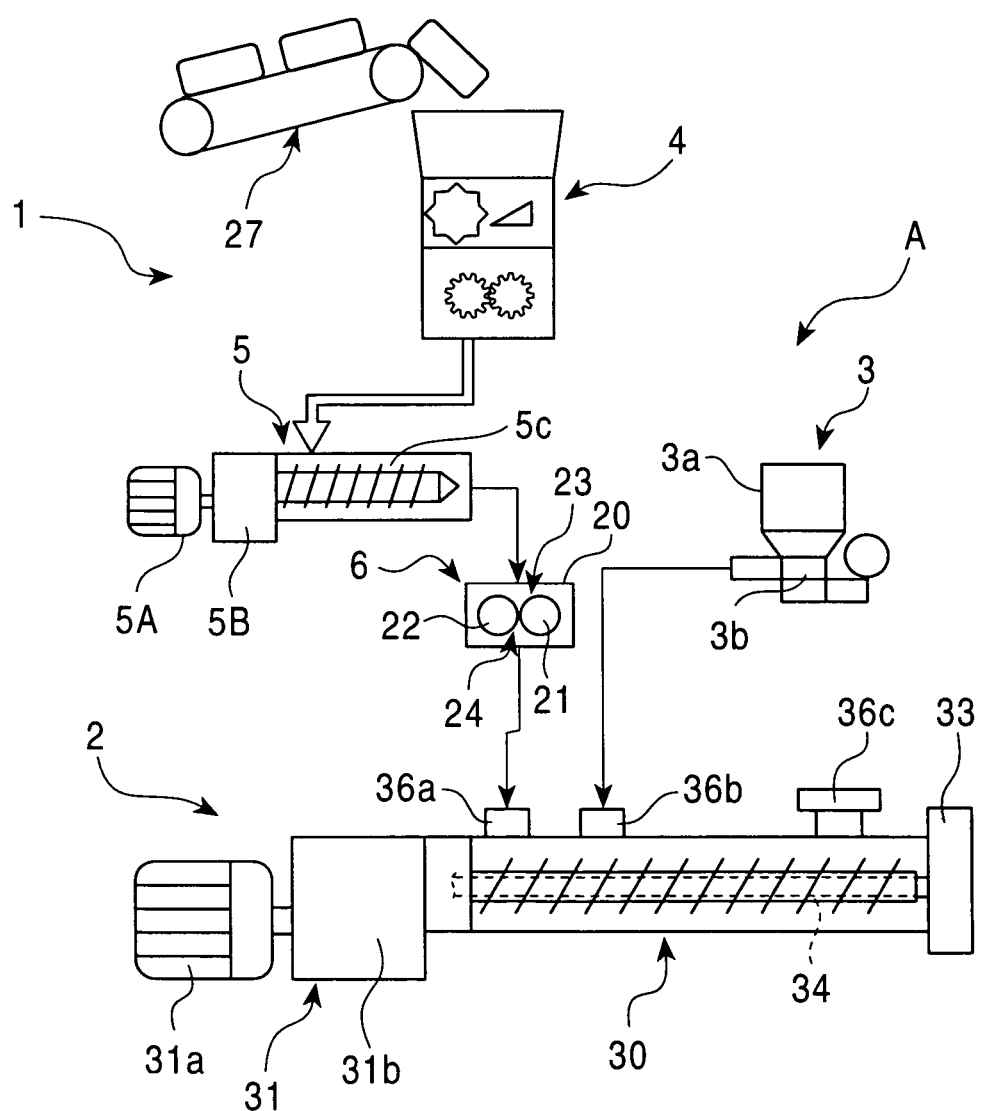
FIG. 1 illustrates the overall structure of a system for kneading and extruding a material.
Figure 2:
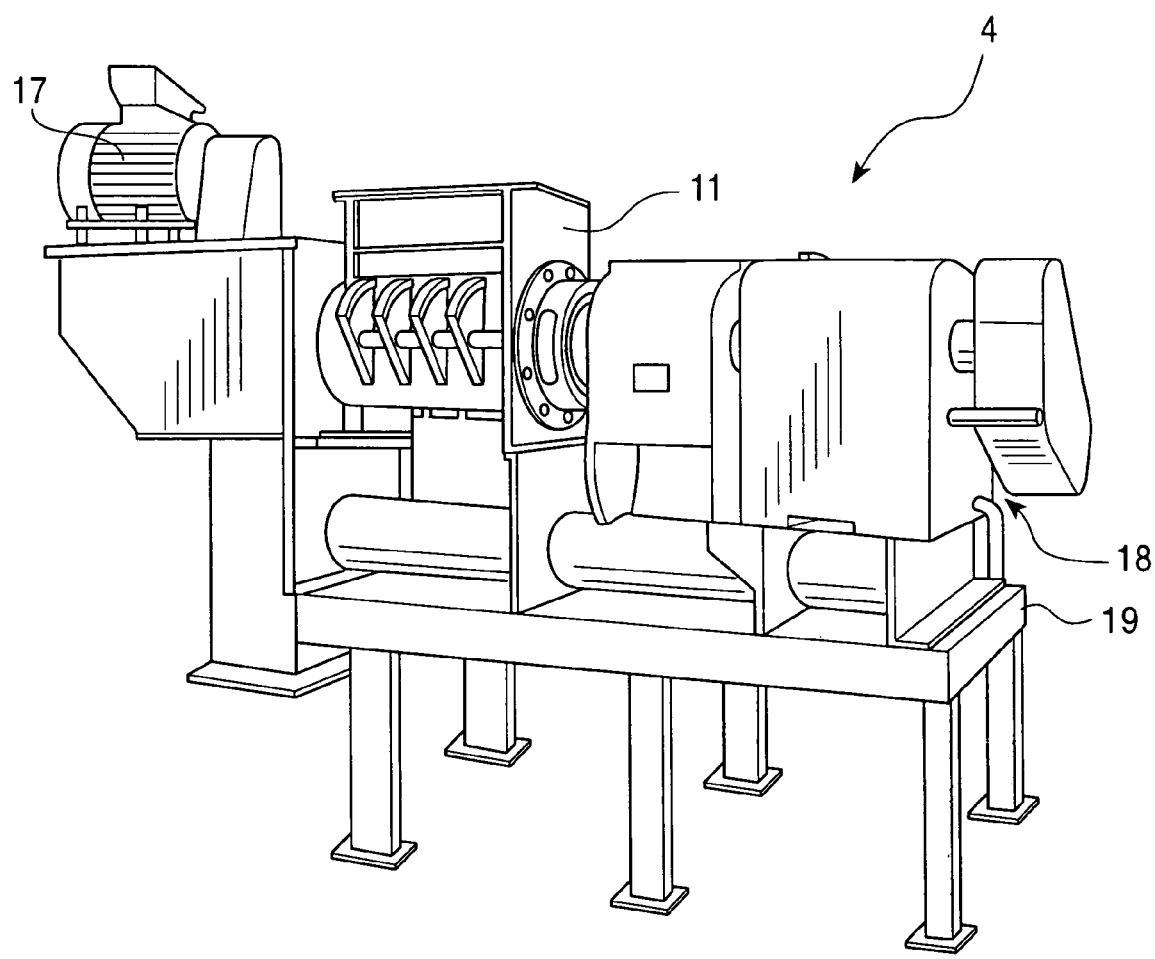
FIG. 2 is a perspective view of a crusher.
Figure 3:
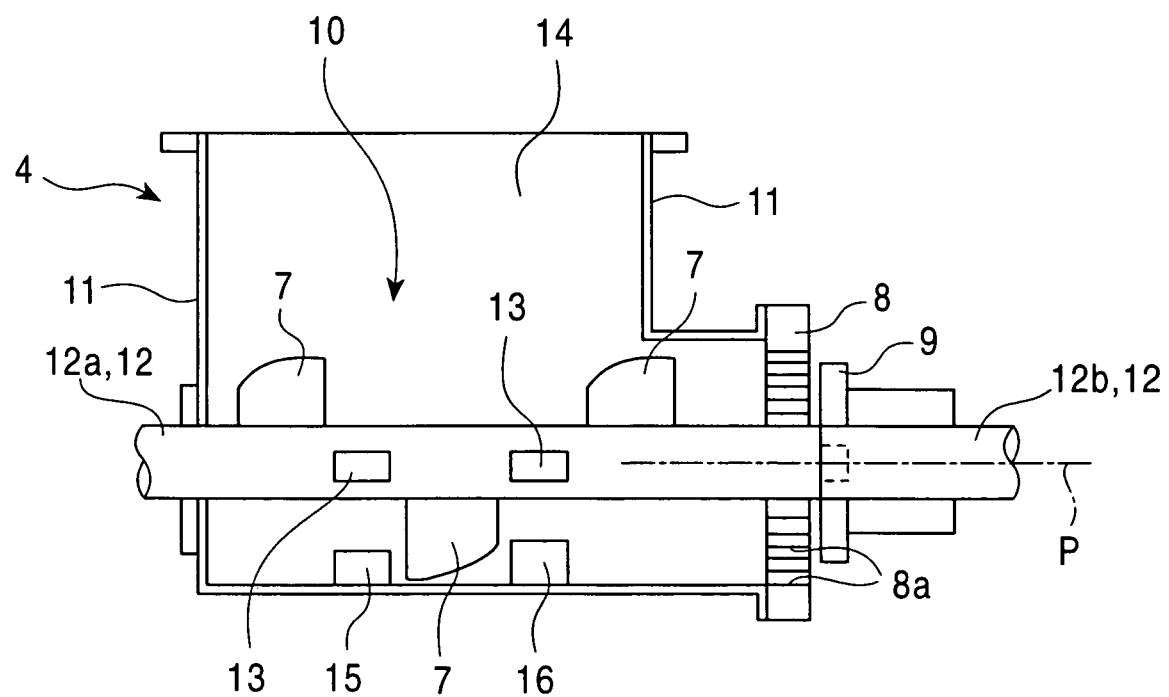
FIG. 3 is a longitudinal sectional view of the crusher, showing the internal structure schematically.
Figure 4:
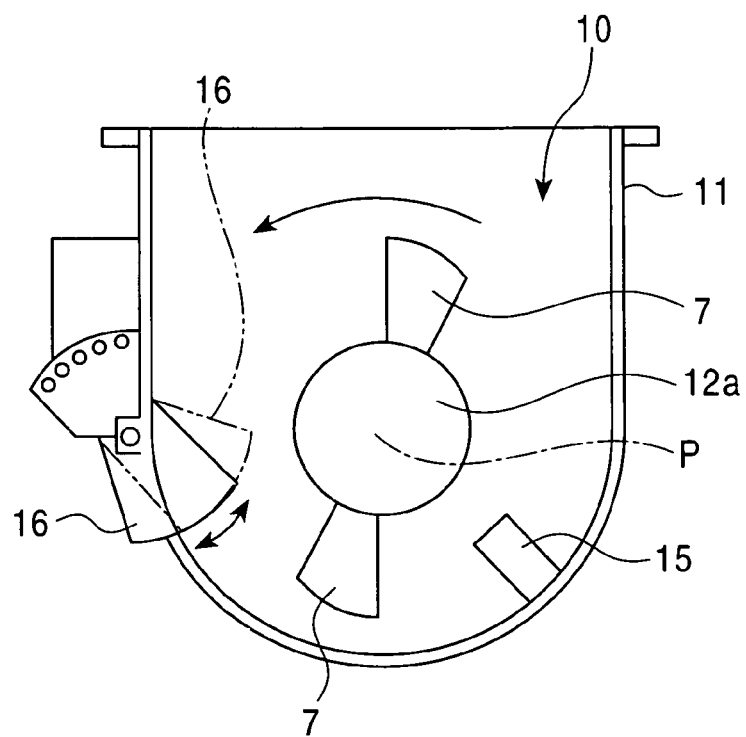
FIG. 4 is a cross sectional view of a crushing section of the crusher.
Figure 5:
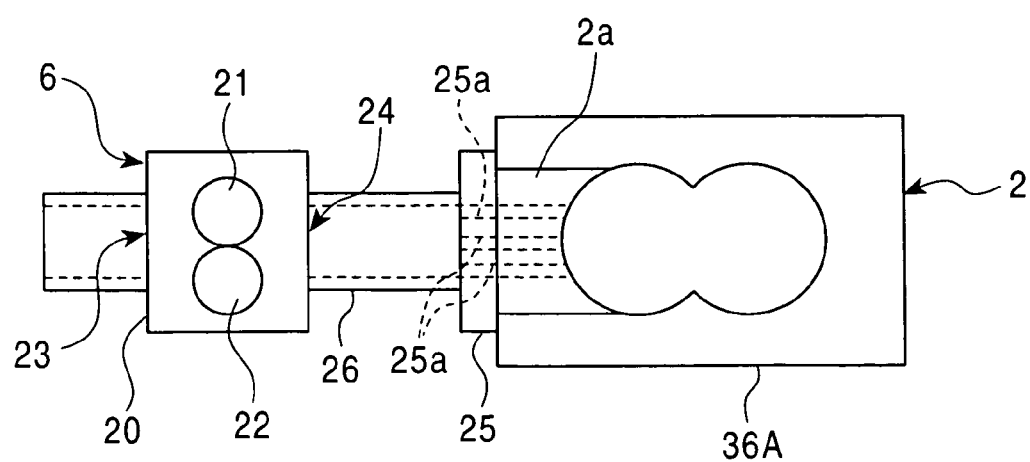
FIG. 5 schematically illustrates the structure between a gear pump and a kneading and extruding apparatus.
Figure 6:
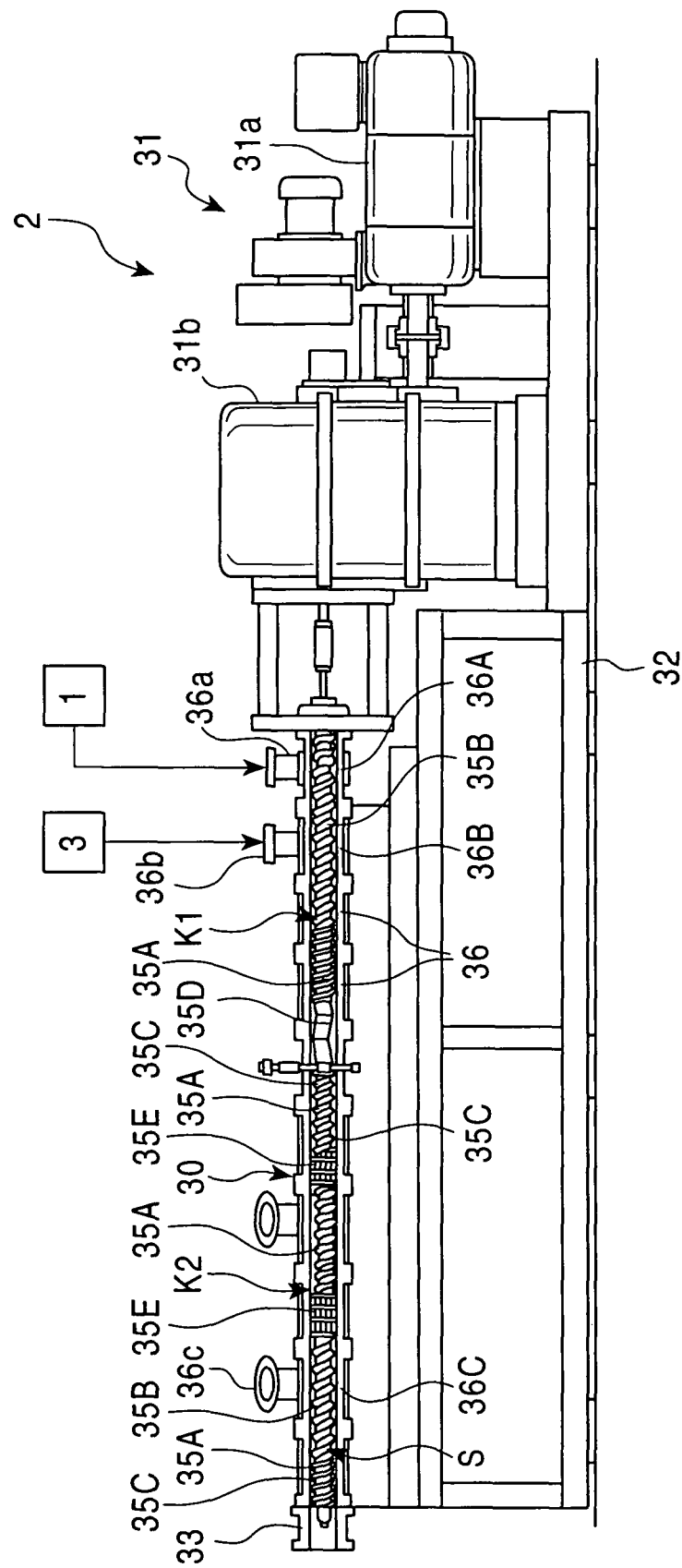
FIG. 6 is a side elevational view with partial internal views of the kneading and extruding apparatus.
Figure 7:
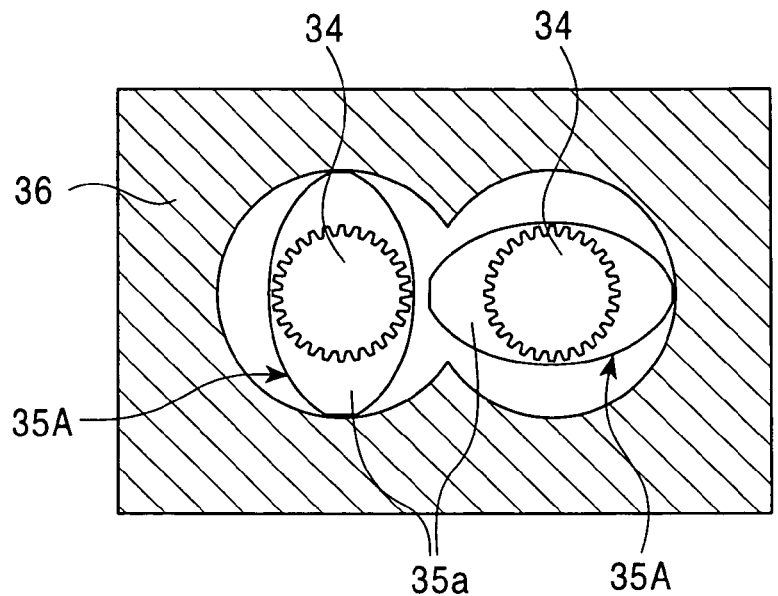
FIG. 7 is a sectional view of a kneading and extruding section.
Figure 8:
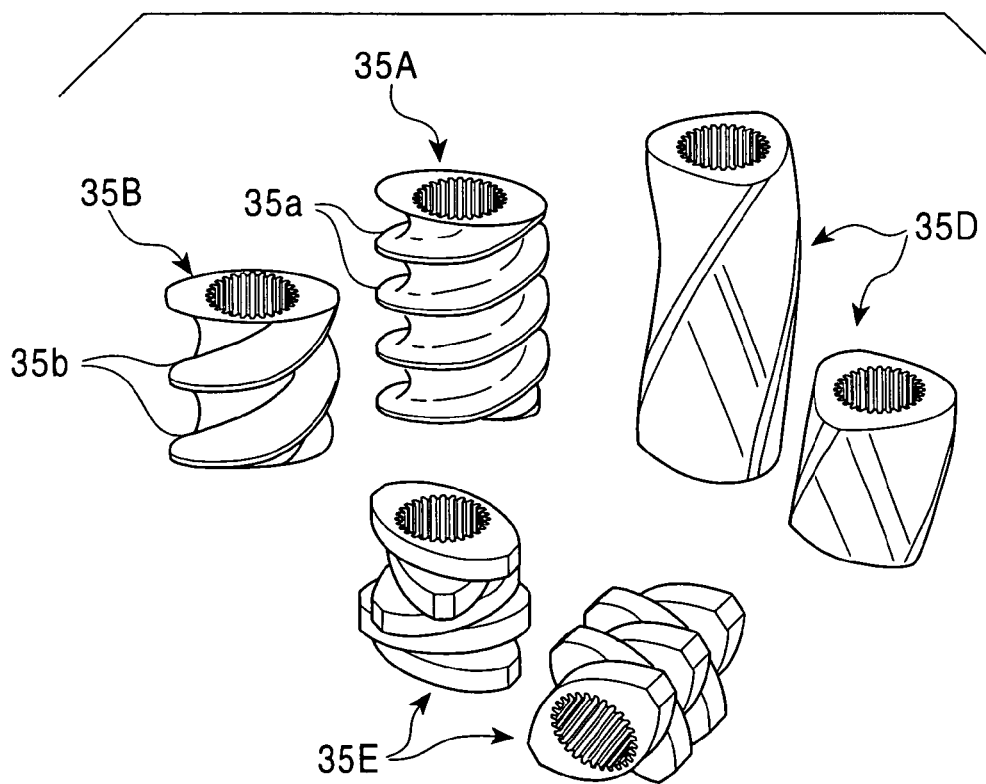
FIG. 8 is a perspective view of various segments of screws.

FIG. 1 shows the overall structure of the system for kneading and extruding a material. FIGS. 2 to 4 illustrate the structure of the crusher. FIG. 5 schematically illustrates the structure when the material passes from the gear pump to the kneading and extruding apparatus (a partly cross-sectional view, looking from the downstream side of the kneading and extruding apparatus to the upstream side and omitting kneading screws). FIGS. 6 to 8 show the structure of the kneading extruding apparatus. A system A for kneading and extruding a material has: a metering feeder 1 acting as a preprocessing device for metering a rubber material in the form of coarse particles; a kneading and extruding apparatus 2 for kneading the crushed material supplied from the metering feeder 1 together with an additive constituting an auxiliary material and for continuously extruding the resulting rubber material; and an additive feeder 3 for supplying the additive.

Firstly, the operation of kneading and extruding of the system A will be described. A rubber material in bale form is transported by a conveyer belt 27 to a crusher 4 and crushed into coarse particles. The rubber material is then supplied to an extruder 5 to be kneaded and metered. The rubber material is extruded from the extruder 5 to a gear pump 6. The rubber material is accurately adjusted by the gear pump 6. This is preprocessing performed by the metering feeder 1.

The rubber material kneaded by the preprocessing of the metering feeder 1 is supplied to the kneading and extruding apparatus 2 through an inlet mounted at the leading end. The rubber material is then kneaded and stirred together with an additive supplied from the additive feeder 3 in a compressed state to be made uniform. The uniform rubber material is continuously extruded from the kneading and extruding apparatus 2. Next, the structure of each part will be described.

As shown in FIG. 1, the metering feeder 1, which is used for supplying a material to the kneading and extruding apparatus 2 from which the material is kneaded and continuously extruded, includes: the conveyer belt 27 for transporting a rubber material in bale or block form; the crusher 4 for crushing the rubber material transported from the conveyer belt 27 into coarse particles; the extruder 5 for conveying and extruding the rubber material crushed by the crusher 4; and the gear pump 6 for receiving and discharging the rubber material extruded from extruder 5.

The crusher 4 is of a general type, such as a rubber chopper. The structure of the crusher 4 is shown in FIGS. 1 to 4. The crusher 4 includes: screw hammers 7 for shearing and conveying a rubber material by revolving in a processing chamber 10; an orifice plate 8 for squeezing the rubber material moved to the trailing end of the processing chamber 10 by the hammers 7 out; and a cutter 9 for cutting the rubber material passing through the orifice plate 8.

At the lower part of a chamber wall 11 with which the processing chamber 10 is surrounded, a revolving shaft 12 extends lengthwise so as to be freely revolvable. The blade-shaped hammers 7, the cutter 9, and nibbler hammers 13 are mounted on the revolving shaft 12. The upper part of the processing chamber 10 constitutes a hopper 14 for receiving a rubber material. A plurality of fixed blades 15 and regulating blades 16 are mounted inside the chamber wall 11 and cooperate with the hammers 7. The regulating blades 16 are shakably mounted so that the positions of the regulating blades 16 are adjustable. The regulating blades 16 are used in such a way that the distance between each of the regulating blades 16 and the revolving shaft 12 is suitably adjusted.

The orifice plate 8 constitutes a disk having a plurality of minute holes 8a formed in the direction parallel to the central axis of the revolving shaft 12. The revolving shaft 12 extends through the orifice plate 8 so that the orifice plate 8 can relatively rotate to the revolving shaft 12. The orifice plate 8 is mounted to the chamber wall 11. The revolving shaft 12 consists of a front shaft 12a and a rear shaft 12b. The front shaft 12a is used for rotating the hammers 7 at low speeds by means of a first motor 17 mounted at the front end of a supporting frame 19 supporting the chamber wall 11, and the rear shaft 12b is used for rotating the cutter 9 at high speeds by means of a second motor 18 mounted at the rear end of the supporting frame 19. The orifice plate 8 may consist of two disks, each having the plurality of minute holes 8a. In that case, one disk is mounted at the rear end of the front shaft 12a and the other disk is mounted at the front end of the rear shaft 12b so that both disks are opposed to each other adjacently.

In the crusher 4, a rubber material in bale form passing through the hopper 14 is sheared between the fixed blades 15 (and the regulating blades 16) and the hammers 7 while being forced to move by rotation of the hammers 7 in the processing chamber 10, and the sheared rubber material is pressed against the orifice plate 8. The pressed rubber material is compacted and squeezed out when passing through the plurality of minute holes 8a. The compacted rubber material is cut into smaller pieces by the cutter 9 revolving at high speeds.

As shown in FIG. 1, the extruder 5 is of a general type, such as an extruding machine, or a screw feeder, and kneads the rubber material crushed by the crusher 4 in a compressed state and meters the rubber material to the gear pump 6. The extruder 5 includes a driving section 5A, a gear section 5B, and an extruding section 5C having twin screws or the like.

The structure of the extruder 5 is not limited, as long as the extruder 5 extrudes a material in a predetermined amount. The extruder 5 may be a conical twin-screw extruder, which has two tapered screws.

As shown in FIGS. 1 and 5, the gear pump 6 is of a general type; a driving gear 21 and a driven gear 22 that mesh together and revolve freely are disposed in a pump casing 20. A rubber material supplied through a suction port 23 is carried through a clearance between the gears 21, 22 and the inner face of the pump casing 20 and is then forced out through a discharge port 24. The gear pump 6 is suitable for metering a material since the amount of supply per unit of time remains nearly constant unless the revolving speed varies.

As shown in FIG. 5, a resistance plate 25 (means for applying a resistance to a material and supplying the material to the kneading and extruding apparatus) is disposed immediately in front of the kneading and extruding apparatus 2 between a discharge pipe 26 of the gear pump 6 and an input port 2a for receiving a rubber material of the kneading and extruding apparatus 2. Like the orifice plate 8, the resistance plate 25 constitutes a disk having a plurality of minute holes 25a. The resistance plate 25 applies a resistance to a rubber material discharged from the gear pump 6 when the rubber material is supplied to the kneading and extruding apparatus 2.

Due to the resistance plate 25, the discharge pressure of the gear pump 6 and the amount of discharged flow are stable. Therefore, the range of adjustments of the number of revolutions of the gear pump 6 required for controlling the discharge pressure of the gear pump 6 is minimized (variations of the number of revolutions is reduced) so that a material is metered with high precision. Because of its elasticity, a rubber material discharged from the gear pump 6 can be pulled into the kneading and extruding apparatus 2 in a large amount at once as soon as the rubber material reaches the kneading and extruding apparatus 2. The resistance plate 25 prevents this phenomenon. As a result, the accuracy of metering a material at the discharge port 24 of the gear pump 6 is maintained when the rubber material enters the kneading and extruding apparatus 2.

As shown in FIG. 1, the additive feeder 3 (means for supplying an additive) includes a storage hopper 3a for storing an additive and a supply unit 3b for supplying an additive stored in the storage hopper 3a in a predetermined amount per unit time to the kneading and extruding apparatus 2 through an additive feeding barrel 36B (described below). The means for supplying an additive may be used for supplying various compounding agents.

The advantageous effects when the metering feeder according the present invention is used for supplying a rubber material will now be described in detail. A rubber material in bale (or block) form supplied to the crusher 4 is crushed into coarse particles. When the rubber material crushed into coarse particles is supplied to the extruder 5 (screw extruder), the extruder 5 can handle the supplied rubber material well without stopping the operation caused by an overload or failing to engage upon receipt thereof. As a result, the extruder 5 can extrude the rubber material with stability. The rubber material extruded from the extruder 5 is thus supplied to the gear pump 6 securely. Since the gear pump 6 can meter the rubber material more accurately than the extruder 5, the rubber material can be metered by the gear pump 6 with stability and high accuracy.

If a high-viscosity rubber composition (e.g., a Mooney viscosity $ML_{1+4}$ (100° C.) is greater than 60) in bale form is supplied to a conical-screw extruder without being crushed into coarse particles, the extruder becomes overloaded and is thus practically out of working order.

In general, a screw extruder has the discharge accuracy (metering accuracy) of the order of ±5% (one with high accuracy has, at best, 3%). By contrast, a gear pump achieves the discharge accuracy of 2% or less. The improvement is only a few percents, but significantly important for the following reason: a rubber material supplied to a kneading and extruding apparatus is kneaded uniformly together with a supplied auxiliary material, such as an additive, (is mixed and kneaded with the auxiliary material evenly) so that the resulting products have a homogeneous property. The auxiliary material, such as the additive, is in grain, powder, or liquid form generally, and it is possible to realize the metering accuracy within ±1% of a metering feeder for measuring and supplying a material having such a form. However, even if the additive is metered to the kneading and extruding apparatus with high accuracy, unevenness in quality of resulting products is not eliminated unless the rubber material is metered with the same accuracy and with stability.

In known techniques, a sufficient study has not been done on the supply of the rubber material in terms of stability or accuracy, and therefore, a further improvement is required. According to the inventors of the present invention, it has been determined that the feeder described above can improve the supply of the rubber material in terms of stability or accuracy.

As shown in FIGS. 1 and 6 to 8, the kneading and extruding apparatus 2 includes: a driving section 31 having a driving motor 31a and a gear box 31b; a base frame 32; and a kneading and extruding section 30. At the rear end of the kneading and extruding section 30, a die head 33 used for extrusion is mounted. The kneading and extruding section 30 includes: a pair of rotating shafts 34 disposed in a lateral direction; a pair of kneading screws 35 fit onto the rotating shafts 34 and, for example, splined to the rotating shafts 34 so as to be rotatable together with the rotating shafts 34; and a barrel 36 consisting of a plurality of barrel units for enclosing the pair of the kneading screws 35. The die head 33 is supported at the rear end of the barrel 36.

The pair of rotating shafts 34 can rotate by the driving section 31 in the same direction at the same speed. The kneading screws 35, which are fit onto the rotating shafts 34, can rotate while a group of blades of one screw is partly engaged with that of the other screw in a lateral direction. The supplied rubber material is moved in the longitudinal direction while being kneaded (stirred and mixed) by rotation of the pair of kneading screws 35 in the barrel 36 in a compressed state so as to be made substantially uniform. The rubber material is then extruded through an outlet 33a of a desired shape in the die head 33.

The barrel 36 includes: a first barrel unit 36A connected to the resistance plate 25 and having a first receiving hopper 36a for receiving a rubber material; and a second barrel unit 36B having a second receiving hopper 36b for receiving an additive. The first barrel unit 36A is disposed at the front end. The second barrel unit 36B is disposed adjacent to the first barrel unit 36A or disposed with less than three other barrel units interposed between the first barrel unit 36A and the second barrel unit 36B. A third barrel unit 36C used for dehydration or the like may be disposed near the rear end of the kneading and extruding section 30.

As shown in FIGS. 6 and 8, the kneading screws 35 include normal screw segments 35A, fast screw segments 35B, delaying screw segments 35C, rotor segments 35D, and kneading disk segments 35E so that these screw segments are aligned in the longitudinal direction. In this embodiment, a kneading section K for kneading a metered material consists of two kneading portions, K1 and K2, having the normal segments 35A so that both portions are aligned in the longitudinal direction. The kneading screws 35 may be formed so that the kneading section K includes more than two kneading portions.

Each of the normal screw segments 35A is of a general type that has a first spiral blade 35a with an average pitch and moves a material while kneading it. Each of the fast screw segments 35B has a second spiral blade 35b with a longer pitch so as to have increased feed speed. Each of the delaying screw segments 35C has a third spiral blade 35c with a significantly reduced pitch or with a reversed pitch so as to have decreased feed speed or move a material in the reverse direction. Each of the rotor segments 35D has a substantially triangular or oval cross section at right angles to the longitudinal direction thereof. A clearance between the rotor segment 35D and the inner face of the barrel is wider than that between the above-described screw segment used for moving a material and thereby applying much shearing stress to the rubber material during kneading. Each of the kneading disk segments 35E has an oval cross section and a plurality of kneading plates with small widths in the longitudinal direction. The plurality of kneading plates are arranged such that each kneading plate is somewhat shifted. A clearance between the kneading disk segment 35E and the inner face of the barrel is more than or equal to that between the screw segment for moving a material and the inner face of the barrel and is smaller than that between the rotor segment 35D and the inner face the barrel, thereby kneading a rubber material evenly and improving the dispersion.

As shown in FIG. 6, the kneading and extruding section 30 includes the first kneading portion K1, the second kneading portion K2, and a supply portion S, from the upstream side in the direction of rubber material feed to the downstream side. The first kneading portion K1 includes the following segments in the order named: a fast screw segment 35B; a normal screw segment 35A; a rotor segment 35D; and a delaying screw segment 35C. The second kneading portion K2 includes the following segments in the order named: a normal screw segment 35A, which lies next to the delaying screw segment 35C at the trailing end of the kneading portion K1; a delaying screw segment 35C; a kneading disk segment 35E; a normal screw segment 35A; and a kneading disk segment 35E. The supply portion S includes the following segments in the order named: a fast screw segment 35B, which lies next to the kneading disk segment 35E at the trailing end of the second kneading portion K2; a normal screw segment 35A; and a delaying screw segment 35C. The supply portion S is used for supplying a kneaded rubber material in a compressed state to the die head 33.

The screw segments 35A to 35C, and the rotor segments 35D, and the kneading disk segments 35E may be arranged in any order and combination. The arrangement can be specified properly in accordance with a material to be kneaded. The kneading section K of the kneading and extruding apparatus 2 may have three or more kneading portions, or may have only one kneading portion.

In the kneading and extruding apparatus 2, at least one set of a delaying element for preventing a material from moving forward, such as a delaying screw segment, or a gate device, is disposed downstream of a kneading element for kneading a material, such as a rotor segment, or a kneading disk segment, and therefore, a clearance at the kneading element is filled with the material. As a result, a metered rubber material, which is discharged from the gear pump 6, and a metered additive from the additive feeder 3 are stirred and kneaded together sufficiently in a compressed state so as to be mixed evenly and be made uniform. The resulting rubber material extruded through the die head 33 at the trailing end has reduced product variations and consistently high quality. In this embodiment, the provision of two kneading portions, K1 and K2, ensures that evenly mixing is performed more effectively.

Figure 9:
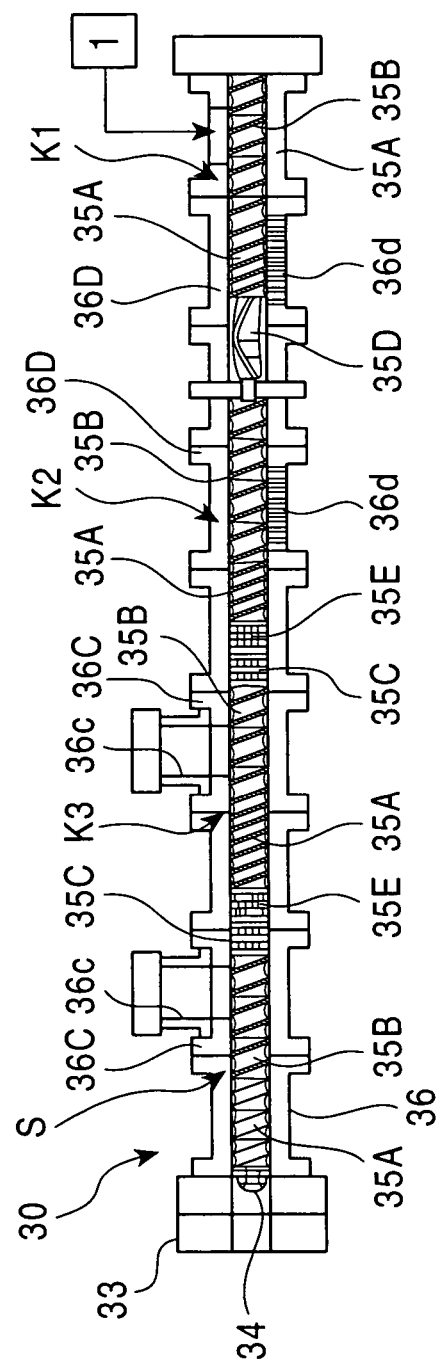
FIG. 9 is a side elevational view with partial internal views of the kneading and extruding section having another structure.

The barrel 36 and the kneading screws 35 in the kneading and extruding section 30 may have different structures. As shown in FIG. 9, from the upstream side in the direction of rubber material feed to the downstream side, the kneading and extruding section 30 includes the following portions in the order named: a first kneading portion K1 in which a fast screw segment 35B, a normal screw segment 35A, and a rotor segment 35D are disposed; a second kneading portion K2 in which a fast screw segment 35B, a normal screw segment 35A, a kneading disk segment 35E, and a delaying screw segment 35C are disposed; a third kneading portion K3 having the same structure as the second kneading segment K2; and a supply portion S in which a fast screw segment 35B and a normal screw segment 35A are disposed. In this embodiment, the first kneading portion K1 and second kneading portion K2 have dehydration barrels 36D with dehydration slits 36d, and the third barrels 36C having exhaust vents 36c are used for deaeration.

It will be appreciated that modifications may be made in the present invention. For example, the extruder 5 of the metering feeder 1 may be a conical twin-screw extruder, and the kneading and extruding apparatus 2 may be a continuous kneader. The metering feeder 1 and the system A according to the present invention are suited to a rubber material and, in particular, to application in which a rubber composition is subjected to dynamic cross-linking with the addition of a cross-linking agent as an additive. The metering feeder 1 and the system A may be used in kneading other synthetic resins. The combination and type of the segments of the kneading and extruding apparatus 2 and the number of the kneading portions K can be changed freely in accordance with a rubber material.

What is claimed is:

1. A system for kneading and extruding a material, comprising:
   a crusher for crushing the material into coarse particles;
   an extruder for conveying and extruding the material crushed by the crusher;
   a gear pump for receiving and discharging the material extruded by the extruder;
   a kneading and extruding apparatus; and
   means for applying a resistance to the material discharged from the gear pump and supplying the material to the kneading and extruding apparatus,
   wherein the means for applying a resistance is disposed immediately in front of the kneading and extruding apparatus.

2. The system according to claim 1, wherein the means for applying a resistance to the material discharged from the gear pump directly contacts the kneading and extruding apparatus.

3. The system according to claim 1, wherein the means for applying a resistance to the material discharged from the gear pump is a resistance plate directly contacting and covering an input port of the kneading and extruding apparatus for the material discharged from the gear pump.

* * * * *